United States Patent [19]

Mizoguchi et al.

[11] Patent Number: 4,957,159
[45] Date of Patent: Sep. 18, 1990

[54] ALUMINUM HEAT EXCHANGER PROVIDED WITH FINS HAVING HYDROPHILIC COATING

[75] Inventors: Masaaki Mizoguchi; Susumu Inoue; Tatsuo Otsuka; Eizo Isoyama, all of Sakai, Japan

[73] Assignee: Showa Aluminum Corporation, Sakai, Japan

[21] Appl. No.: 323,741

[22] Filed: Mar. 15, 1989

Related U.S. Application Data

[63] Continuation-in-part of Ser. No. 32,256, Mar. 31, 1987, abandoned.

[30] Foreign Application Priority Data

Apr. 3, 1986 [JP]   Japan .................................. 61-77830

[51] Int. Cl.$^5$ .............................................. F28F 13/18
[52] U.S. Cl. .................................... 165/133; 165/134.1
[58] Field of Search ............................... 165/133, 134.1

[56] References Cited

U.S. PATENT DOCUMENTS 3,926,905 12/1975 Nose et al. .......................... 260/42.43
4,341,878 7/1982 Marcantonio et al. ................. 524/3

FOREIGN PATENT DOCUMENTS 60-101156 6/1985 Japan .................................. 165/133

Primary Examiner—Martin P. Schwadron
Assistant Examiner—Allen J. Flanigan
Attorney, Agent, or Firm—Armstrong, Nikaido, Marmelstein, Kubovcik & Murray

[57] ABSTRACT

The fins of an aluminum heat exchanger are treated with a coating composition comprising an alkali silicate, an inorganic hardening agent and a water-soluble organic high-molecular-weight compound, whereby a hydrophilic coating is formed over the surfaces of the fins.

11 Claims, 2 Drawing Sheets

ALUMINUM HEAT EXCHANGER PROVIDED WITH FINS HAVING HYDROPHILIC COATING

This is a continuation-in-part of application Ser. No. 032,256, filed Mar. 31, 1987 now abandoned.

BACKGROUND OF THE INVENTION

The present invention relates to a heat exchanger made of aluminum and provided with fins which have a hydrophilic coating.

The term "aluminum" as used herein and in the appended claims includes pure aluminum, commercial aluminum containing small amounts of impurities, and aluminum alloys consisting predominantly of aluminum.

Generally with heat exchangers, especially with the evaporators of air conditioning apparatus, the surface temperature of the fins on the tubes falls below the dew point of the atmosphere, so that drops of water adhere to the surfaces of the fins. The deposition of such water drops results in increased resistance to the flow of air, reducing the amount of flow of air and entailing a decreased heat exchange efficiency. This tendency becomes more pronounced when the spacing between the fins is reduced to improve the performance of the heat exchanger and to diminish the size thereof. The heat exchange efficiency is greatly influenced by the wettability of the fin surface with water. When the fin surface has good wettability, the water deposited thereon is less likely to become water drops. This results in reduced resistance to the flow of air and an increased amount of flow of air to achieve a higher heat exchange efficiency. To give improved wettability to fin surfaces, a process has been proposed for forming a coating of water glass (alkali silicate) on the surfaces of aluminum fins (see Published Examined Japanese Patent Application No. 48177/1978). This gives an improved hydrophilic property to the fin initially, but the hydrophilic property becomes impaired early and is not sustainable satisfactorily. Further when the fin material to be shaped is formed with the water glass coating which is hard, cracks develop in bent portions of fins when the material is burred to form the fins, hence poor shapability. The coated material, moreover, is liable to cause wear on the die.

SUMMARY OF THE INVENTION

The main object of the present invention is to overcome the above problems and to provide a heat exchanger made of aluminum and provided with fins which have a hydrophilic coating.

The present invention provides a heat exchanger made of aluminum and comprising a tube and fins attached to the tube, the heat exchanger being characterized in that the fins are treated with a coating composition comprising an alkali silicate, an inorganic hardening agent and a water-soluble organic high-molecular-weight compound and thereafter dried by heating, whereby a hydrophilic coating is formed over the surfaces of the fins.

The water-soluble organic high-molecular-weight compound serves to effectively prevent the alkali silicate from giving off a cement odor and also to sustain over a prolonged period the hydrophilic properties of the film prepared from the alkali silicate and the inorganic hardening agent.

Thus, the above-mentioned composition forms over the surfaces of the fins hydrophilic films which release no cement odor and retain sustained hydrophilic properties over a prolonged period of time.

According to the invention, the coating composition is applied to a thin aluminum plate for forming the heat exchanger fins or a heat exchanger comprising the combination of shaped fins and a tube to form the hydrophilic coating. In the case of a fin material in the form of a thin aluminum plate, the material can be treated and further processed in the form of a flat plate having a specified length, but it is preferable to continuously treat and process the material in the form of a coil.

After the aluminum fins (including shaped fins and fin material before shaping) have been treated with the coating composition, the aluminum fins are dried by heating, whereby a hydrophilic coating is formed.

DETAILED DESCRIPTION OF THE DRAWINGS

Figure 1:
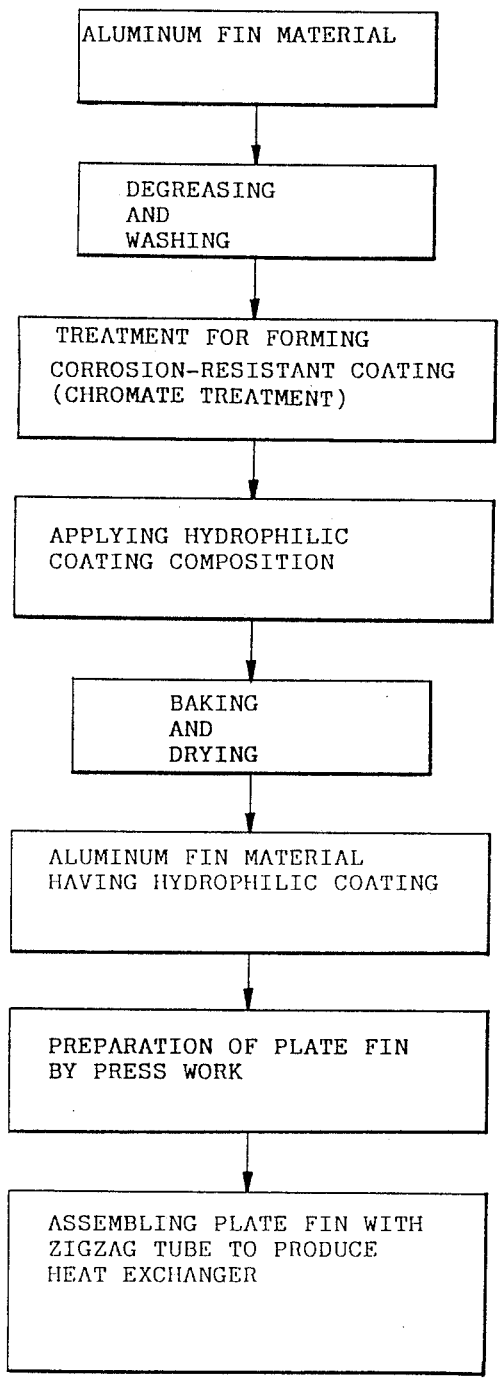
FIG. 1 illustrates a block diagram showing the process of producing a heat exchanger according to the present invention.

FIG. 1 illustrates by way of a block diagram the process for producing the heat exchanger of the present invention. Each block illustrates a step in the process beginning with the aluminum fin material and ending with assembling the plate fin with a zigzag tube to produce the heat exchanger. The steps are clearly described in the examples that follow.

Figure 2:
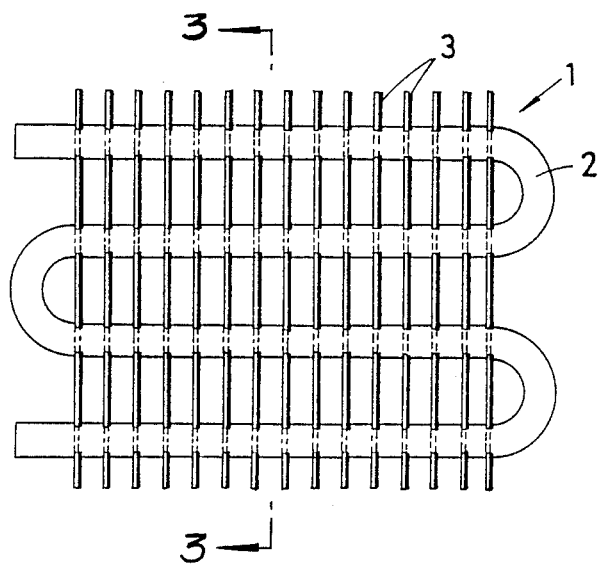
FIG. 2 shows a schematic front view of a heat exchanger according to the present invention.

FIG. 2 shows a front schematic view of a preferred embodiment of the present invention wherein 1 indicates a heat exchanger. The zigzag tube 2 is assembled with plate fins 3 to produce the heat exchanger.

Figure 3:
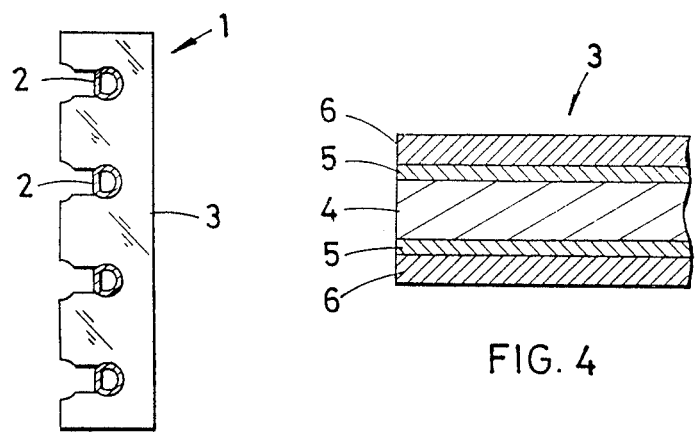
FIG. 3 shows an enlarged sectional view of a heat exchanger according to the present invention taken along the line III—III of FIG. 2.

FIG. 3 shows a sectional view of a heat exchanger according to the present invention illustrating the arrangement of the zigzag tube 2 and a plate fin 3.

Figure 4:
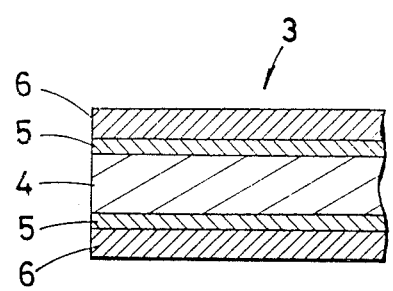
FIG. 4 shows an enlarged sectional view of a fin of a heat exchanger according to the present invention.

FIG. 4 shows an enlarged sectional view of a plate fin. The fin base material 4 is coated with a corrosion resistant coating 5 and a hydrophilic coating 6, according to the present invention.

DETAILED DESCRIPTION OF THE INVENTION

According to the present invention, aluminum heat exchanger fins are treated with a coating composition comprising an alkali silicate, an inorganic hardening agent and a water-soluble organic high-molecular-weight compound, whereby a hydrophilic coating is formed over the surfaces of the fins.

With the aluminum heat exchanger of the invention comprising fins which have the hydrophilic coating, the water drops deposited on the fin immediately collapse to spread over the fin surface in the form of a film, with the result that the water flows down and falls off the fin. The water remaining on the fin owing to surface tension also forms a thin film and therefore will not impede the flow of air. Accordingly the heat exchanger achieves a high heat exchange efficiency without the likelihood that the deposition of water drops produces increased resistance to the flow of air.

Examples of useful alkali silicates as one of the components of the hydrophilic film forming composition are sodium silicate, potassium silicate, lithium silicate, etc.

The alkali silicate acts to impart hydrophilic properties to aluminum. The silicate to be used is at least 1 in the ratio of $SiO_2/M_2O$ wherein M is an alkali metal such as lithium, sodium or potassium. Especially preferable are alkali silicates which are 2 to 5 in $SiO_2/M_2O$ ratio. If the $SiO_2/M_2O$ ratio is less than 1, $SiO_2$ is smaller than the alkali component in proportion, permitting the alkali component to corrode aluminum markedly. Further if the proportion of the alkali silicate in the composition is small, the composition fails to form a satisfactory hydrophilic film on the surface of aluminum. Conversely, if the proportion is excessive, the film obtained is too hard, and the coated material will not be shaped easily with good abrasion resistance with dies.

The inorganic hardening agent, another component of the hydrophilic film forming composition, acts to harden the alkali silicate film. The hardening agent is used in an amount of 0.1 to 5 parts by weight per part by weight of the alkali silicate. If the amount is less than 0.1 part by weight, the alkali silicate film will not be hardened satisfactorily, whereas amounts exceeding 5 parts by weight make the film less resistant to water.

Examples of useful inorganic hardening agents are alkali pyrophosphates such as lithium pyrophosphate, potassium pyrophosphate, sodium pyrophosphate; phosphates such as aluminum phosphate, magnesium phosphate and aluminum tripolyphosphate; tripolyphosphoric acid; oxides of metals such as magnesium and zirconium; carbonates, sulfates, sulfides and chlorides of polyvalent metals; etc.

The water-soluble organic high-molecular-weight compound, another component of the present composition, acts to inhibit cement odor and to sustain the hydrophilic properties of the film over a prolonged period of time. The water-soluble organic high-molecular-weight compound is used in an amount of 0.01 to 5 parts by weight per part by weight of the alkali silicate. If used in an amount less than 0.01 part by weight, the compound is unable to effectively prevent release of the odor and to fully sustain the hydrophilic properties. Conversely, presence of more than 5 parts by weight of the compound renders the film easily soluble in water, failing to sustain the hydrophilic properties.

Examples of useful water-soluble organic high-molecular-weight compounds are (a) natural high-molecular-weight compounds of the polysaccharide type, (b) natural high-molecular-weight compounds of the water-soluble protein type, (c) water-soluble synthetic high-molecular-weight compounds of the anionic, nonionic or cationic addition polymerization type, and (d) water-soluble high-molecular weight compounds of the polycondensation type.

Examples of useful polysaccharide-type compounds (a) are carboxymethylcellulose, guar gum, etc.

Examples of useful protein-type compounds (b) are gelatin, etc.

Examples of synthetic compounds (c) of the anionic or nonionic addition polymerization type are polyacrylic acid, sodium polyacrylate, polyacrylamide, these compounds as partially hydrolyzed, polyvinyl alcohol, polyhydroxyethyl (meth)acrylate, acrylic acid copolymer, maleic acid copolymer, and alkali metal salts, organic amine salts or ammonium salts of these compounds. These compounds of the addition polymerization type are also usable as carboxymethylated, sulfonated or otherwise modified.

Examples of useful synthetic compounds (c) of the cationic addition polymerization type are polyethyleneimine, Mannich-modified compound of polyacrylamide, diacryldimethy aluminum chloride, and polyalkylamino (meth)acrylates such as dimethylaminoethyl acrylate.

Examples of useful water-soluble high-molecular-weight compounds of the polycondensation type are polyalkylene polyols such as polyoxyethylene glycol, polycondensation product of epichlorohydrin and a polyamine such as ethylenediamine or hexamethyldiamine, water-soluble polyurethane resin prepared by polycondensation of water-soluble polyether and polyisocyanate, polyhydroxymethylmelamine resin, etc.

Preferable among the above-mentioned water-soluble organic high-molecular-weight compounds are those of the anionic addition polymerization type having a carboxylic acid group or a group of salt thereof, more preferable examples being polyacrylic acid, acrylic acid copolymer.

Examples of preferred acrylic acid copolymers and maleic acid copolymers are copolymer of acrylic acid and maleic acid, copolymer of acrylic acid or maleic acid, and methacrylic acid, methyl methacrylate, ethyl methacrylate, hydroxyethyl methacrylate, itaconic acid, vinylsulfonic acid or acrylamide, and copolymer of vinylsulfonic acid and acrylamide.

The aluminum fins (including shaped fins and fin material before shaping) are coated with the aqueous solution of the above mixture by spraying, brushing or by being immersed in the aqueous solution.

The aluminum fins thus treated are then heated at 50 to 200° C, preferably 150 to 180° C, for 30 seconds to 30 minutes for drying, whereby a hydrophilic coating is formed over their surfaces.

When the drying temperature is below 50° C, the composition will not be made into a satisfactory coating, whereas if the temperature is over 200° C, the higher temperature will not produce any improved effect but adversely affect the aluminum substrate. Further if the heat-drying time is less than 30 seconds, the composition will not be made into a satisfactory coating, whereas if it is over 30 minutes, reduced productivity will result. When the heat-drying temperture is high, i.e. 160 to 200° C, the drying time may be as short as 30 seconds to 1 minute, but the drying time must be prolonged when the temperature is low. If dried insufficiently, the composition will not be made into a coating satisfactorily.

The hydrophilic coating is formed over the surfaces of aluminum fins in an amount of 0.1 to 10 g/m², preferably 0.5 to 3 g/m². If the amount is at least 0.1 g/m², the coating exhibits good hydrophilic properties initially. For the coating to retain further satisfactory hydrophilic properties, the amount is prefably at least 0.5 g/m². If the amount exceeds 10 g/m², the coating requires a longer drying time, and the coated material will not be shaped satisfactorily by press work, hence undesirable.

The aqueous coating composition may of course have incorporated therein known additives including inorganic corrosion inhibitors such as sodium nitrite, sodium polyphosphate and sodium metaphosphate, and organic corrosion inhibitors such as benzoic acid or salt thereof, p-nitrobenzoic acid or salt thereof, cyclohexylamine carbonate and benzotriazole.

To give the aluminum fins corrosion resistance and enhanced adhesion to the hydrophilic coating, it is desired to form a corrosion-resistant coating first on the aluminum surface by the chromate process, phosphoric acid-chromate process, boemite process, phosphoric acid process or the like and to thereafter treat the surface of the coating with the coating composition of the invention.

Further when a thin aluminum plate for forming fins is formed with the hydrophilic coating, it is desirable to form on the surface of the coating a covering layer of wax, or wax and polyvinyl alcohol or like water-soluble high-molecular compound to greatly reduce the wear on the die which is used for shaping the aluminum plate into fins of desired form.

The present invention will be further described with reference to examples and comparative example.

EXAMPLE 1

A specimen was prepared using an aluminum plate made of JIS A-1100H24 and measuring 1 mm in thickness, 50 mm in width and 100 mm in length.

The surface of the aluminum plate was first treated by the chromate process to form an oxide film thereon and then coated with an aqueous solution comprising a hydrophilic film forming composition of the invention which was composed of three components in specified proportions as listed in the table below. (The solution contained 1.5% of the listed alkali silicate calculated as solids.) The coated plate was thereafter heat-dried at 160° C for 10 minutes to form a hydrophilic film on the surface of the aluminum plate. The coated aluminum plate was shaped into fins for a heat exchanger. The fins and a tube were assembled into a heat exchanger. The alkali silicate used for the composition had an $SiO_2/Na_2O$ ratio of 3.

EXAMPLES 2 to 7

The same procedure as in Example 1 was repeated using hydrophilic film forming compositions comprising different components in different proportions as listed below.

COMPARATIVE EXAMPLE

The procedure of Example 1 was repeated using a film forming composition which was free from any water-soluble organic hight-molecular-weight compound.

Evaluation Test

To evaluate the properties of the fins thus prepared, the fins were checked for hydrophilic properties and cement odor, with the results listed below.

For the evaluation of the hydrophilic properties, the angle of contact between the fin and water was measured in the initial stage, after immersing the fin in running water for 100 hours (water resistance) and after immersing the fin in oleic acid for 16 hours and in running water for 8 hours alternately, five times in each liquid (oil resistance).

The hydrophilic properties were evaluated according to the criteria of: A when the angle of contact was up to 15 degrees, and B when the angle of contact was 16 to 30 degrees. The degree of cement odor was determined according to the criteria of: A for no odor, B for a slight odor, and C for a very strong odor.

For comparison, the same aluminum plate as used above was coated with an aqueous solution of an alkali silicate and inorganic hardening agent and then dried by heating to form an alkali silicate film on the aluminum plate. The resulting plate was evaluated in the same manner as above with the results also listed below.

| | Composition of hydrophilic film (wt. part) | | | Hydrophilic properties | | | |
|---|---|---|---|---|---|---|---|
| Example | Alkali silicate | Inorganic hardening agent | Water-soluble organic high-molecular-weight compound | Intial | Water resistance | Oil resistance | Cement odor |
| 1 | Sodium silicate (1) | Aluminum phosphate (0.5) | Na salt of acrylic acid-acrylamide copolymer (1) | A | A | A | A |
| 2 | Sodium silicate (1) | Aluminum tripolyphosphate (0.2) | K salt of acrylic acid-acrylamide copolymer (2) | A | A | A | A |
| 3 | Potassium silicate (1) | Aluminum phosphate (0.2) | Na salt of acrylic acid-hydroxyethyl methacrylate copolymer (1) | A | A | A | A |
| 4 | Lithium silicate (1) | Tripolyphosphoric acid (0.1) | K salt of maleic acid-acrylamide copolymer (0.5) | A | A | A | B |
| 5 | Sodium silicate (1) | Zirconium oxide (0.1) | Polyethyleneimine (0.5) | A | A | A | B |
| 6 | Potassium silicate (1) | Tripolyphosphoric acid (1) | Vinylsulfonic acid-acrylamide copolymer (1) | A | A | A | B |
| 7 | Sodium silicate (1) | Potassium pyrophosphate (1) | K salt of acrylic acid-acrylamide copolymer (2) | A | A | A | A |
| Comp. Ex. | Potassium silicate (1) | Tripolyphosphoric acid (0.5) | — | A | A | A | C |

The above table reveals that the hydrophilic films formed on the surfaces of the fins using the compositions of the invention have outstanding hydrophilic perperties and are almost free from any cement odor unlike the film of the comparative example.

What is claimed is:

1. A heat exchanger made of aluminum and comprising a tube and fins attached to the tube, wherein the fins are coated with a composition consisting essentially of an alkali silicate, an inorganic hardening agent and a water-soluble high-molecular-weight organic compound.

2. A heat exchanger as defined in claim 1 wherein the composition comprises 0.1 to 5 parts by weight organic of the inorganic hardening agent per part by weight of the alkali silicate and 0.01 to 5 parts by weight of the water-soluble organic high-molecular-weight compound per part by weight of the alkali silicate.

3. A heat exchanger as defined in claim 1 wherein the alkali silicate is 2 to 5 in the ratio of $SiO_2/M_2O$ wherein M is an alkali metal.

4. A heat exchanger as defined in claim 1 wherein the alkali silicate is a salt selected from the group consisting of sodium silicate, potassium silicate and lithium silicate.

5. A heat exchanger as defined in claim 1 wherein the inorganic hardening agent is a compound selected from the group consisting of lithium pyrophosphate, potassium pyrophosphate, sodium pyrophosphate, aluminum phosphate, magnesium phosphate, tripolyphosphoric acid, aluminum tripolyphosphate, magnesium oxide, zirconium oxide, and carbonates, sulfates, sulfides and chlorides of polyvalent metals.

6. A heat exchanger as defined in claim 1 wherein the water-soluble organic high-molecular-weight compound is a compound selected from the group consisting of natural high-molecular-weight compound of the polysaccharide type, natural high-molecular-weight compound of the water-soluble protein type, water-soluble synthetic compound of the anionic, nonionic or cationic addition polymerization type and water-soluble high-molecular-weight compound of the polycondensation type.

7. A heat exchanger as defined in claim 6 wherein the natural high-molecular-weight compound of the polysaccharide type is carboxymethylcellulose or guar gum.

8. A heat exchager as defined in claim 6 wherein the natural high-molecular-weight compound of the water-soluble protein type is gelatin.

9. A heat exchanger as defined in claim 6 wherein the synthetic high-molecular-weight compound of the anionic or nonionic addition polymerization type is a compound selected from the group consisting of polyacrylic acid, sodium polyacrylate, polyacrylamide, partially hydrolyzed products of these compounds, polyvinyl alcohol, polyhydroxyethyl (meth)acrylate, acrylic acid copolymer, maleic acid copolymers, alkali metal salts, organic amine salts and ammonium salts of these compounds, and modified water-soluble synthetic high-molecular-weight compounds prepared by carboxymethylating or sulfonating said synthetic high-molecular-weight compounds of the addition polymerization type.

10. A heat exchanger as defined in claim 6 wherein the sythetic high-molecular-weight compound of the cationic addition polymerization type is a compound selected from the group consisting of polyethyleneimine, Mannich-modified compound of polyacrylaminde, diacryldimethyl aluminum chloride and polyalkylamino (meth)acrylate.

11. A heat exchanger as defined in claim 6 wherein the water-soluble high-molecular-weight compound of the polycondensation type is a compound selected from the group consisting of polyalkylene polyol, polycondensation product of polyamine and epichlorohydrin, water-soluble polyurethane resin prepared by the polycondensation of water-soluble polyether and polyisocyanate and polyhydroxymethylmelamine resin.

* * * * *